United States Patent
Bousfield, III et al.

(10) Patent No.: US 7,902,779 B2
(45) Date of Patent: Mar. 8, 2011

(54) SYSTEM AND METHOD FOR LIMITING INPUT VOLTAGE TO A POWER DELIVERY SYSTEM HAVING REGENERATION CAPABILITY

(75) Inventors: John Channing Bousfield, III, Murrysville, PA (US); Xuan Zhang, Monroeville, PA (US); Ronald Gaillot, Lower Burrell, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 298 days.

(21) Appl. No.: 12/167,623

(22) Filed: Jul. 3, 2008

(65) Prior Publication Data

US 2009/0009149 A1 Jan. 8, 2009

Related U.S. Application Data

(60) Provisional application No. 60/948,072, filed on Jul. 5, 2007.

(51) Int. Cl.
*H02P 7/00* (2006.01)
(52) U.S. Cl. .......... 318/432; 318/430; 318/450; 318/759
(58) Field of Classification Search ............. 318/63, 318/139, 375, 430, 432, 459, 759; 303/10, 303/113.1; 363/41, 65, 71
See application file for complete search history.

(56) References Cited

U.S. PATENT DOCUMENTS

| | | | | |
|---|---|---|---|---|
| 4,456,097 A * | 6/1984 | Salihi | ............ | 187/289 |
| 5,712,456 A * | 1/1998 | McCarthy et al. | ............ | 187/290 |
| 6,313,600 B1 * | 11/2001 | Hammond et al. | ............ | 318/798 |
| 6,331,365 B1 * | 12/2001 | King | ............ | 429/9 |
| 6,417,644 B2 * | 7/2002 | Hammond et al. | ............ | 318/759 |
| 6,542,390 B2 * | 4/2003 | Bixel | ............ | 363/71 |
| 6,737,822 B2 * | 5/2004 | King | ............ | 318/375 |
| 6,777,898 B2 * | 8/2004 | Peterson | ............ | 318/139 |
| 6,847,531 B2 * | 1/2005 | Bixel | ............ | 363/71 |
| 6,870,337 B2 * | 3/2005 | Peterson | ............ | 318/459 |
| 7,049,792 B2 * | 5/2006 | King | ............ | 320/126 |
| 7,135,833 B2 * | 11/2006 | DeLange et al. | ............ | 318/762 |
| 7,170,767 B2 * | 1/2007 | Bixel | ............ | 363/65 |
| 7,414,866 B2 | 8/2008 | Zhang | | |
| 2002/0085398 A1 * | 7/2002 | Bixel | ............ | 363/41 |

(Continued)

FOREIGN PATENT DOCUMENTS

JP 6109478 A 5/1986

OTHER PUBLICATIONS

Yusivar, F et al., "Ig added flux weakening strategy for the rotor flux oriented control of a sinusoidal PWMVSI-fed induction motor" IECON'01. Proceedings of the 27th Annual.

(Continued)

*Primary Examiner* — Paul Ip
(74) *Attorney, Agent, or Firm* — Filip A. Kowalewski

(57) ABSTRACT

A system and method for limiting input voltage to a power delivery system having regeneration capability. According to various embodiments, the system includes a regulator having a multiple input variables and at least one output variable; and an accumulator in communication with the regulator wherein the accumulator presets the output of the regulator to facilitate a quick output as well as accumulates error values related to the multiple input variables and facilitates a change by the regulator to the at least one output variable based upon the accumulated values.

17 Claims, 3 Drawing Sheets

U.S. PATENT DOCUMENTS

| | | | |
|---|---|---|---|
| 2004/0041530 A1* | 3/2004 | Peterson | 318/254 |
| 2004/0189231 A1* | 9/2004 | Peterson | 318/439 |
| 2005/0219879 A1* | 10/2005 | Bixel | 363/71 |
| 2006/0106521 A1* | 5/2006 | Nasr et al. | 701/82 |
| 2006/0113929 A1* | 6/2006 | DeLange et al. | 318/63 |
| 2006/0274560 A1 | 12/2006 | Rastogi et al. | |
| 2007/0176486 A1* | 8/2007 | Nakamura | 303/115.1 |
| 2007/0252428 A1* | 11/2007 | Okano et al. | 303/113.1 |
| 2008/0174172 A1* | 7/2008 | Cannata | 303/10 |
| 2008/0183361 A1* | 7/2008 | Oyama | 701/99 |

OTHER PUBLICATIONS

Conference of the IEEE Industrial Electronics Society. Denver, CO, Nov. 29-Dec. 2, 2001, [Annual Conference of the IEEE Industrial Electronics Society], New York, NY: IEEE.

US, vol. 2, Nov. 29, 2001, pp. 1160-1165, XP010572942 ISBN: 978-0-7803-7108-8.

Astrom, et al., "Integrator Windup and How to Avoid It" 19890601, Jun. 1, 1989, pp. 1693-1698, XP031106797.

\* cited by examiner

SYSTEM AND METHOD FOR LIMITING INPUT VOLTAGE TO A POWER DELIVERY SYSTEM HAVING REGENERATION CAPABILITY

CROSS-REFERENCE TO RELATED APPLICATIONS

This application claims the priority benefit of U.S. Provisional Application No. 60/948,072 filed on Jul. 5, 2007.

BACKGROUND

This application discloses an invention that is related, generally and in various embodiments, to a system and method for limiting input voltage to a power supply system having regeneration capability.

Power delivery systems such as AC motor drives are generally available as either a fully regenerative system or as a non-regenerative system. For non-regenerative systems, input power flows from an input power source to the load, and power produced by the load is blocked from flowing back to the input power source. In fully regenerative systems, input power flows from an input power source to the load, and the power produced by the load may flow back to the input power source.

It is known in the art for such fully regenerative systems to comprise an active front end to control regenerative current. However, active front ends may tend to cause some level of distortion of the incoming AC power. To reduce the distortion and smooth the input current on each leg of the AC input, it is also known to utilize line reactors on each leg of the AC input. However, the line reactors tend to be a relatively bulky and expensive solution to the distortion problem.

For many applications, only a portion of the power produced by the load is required for purposes of braking, etc. For such applications, a regenerative system generally provides much more regeneration capability than is required. Accordingly, most regenerative systems are not very cost-effective for applications which require limited regeneration capability.

To realize a drive with limited regeneration capability, it is known to configure a drive with a combination of regenerative and non-regenerative cells. For example, U.S. patent application Ser. No. 11/419,064 (the '064 application) discloses such a drive. The drive disclosed by the '064 application may be configured to have varying levels of regeneration capability by varying the number of regenerative versus non-regenerative cells in the drive, and each regenerative power cell may comprise an active front end that comprises switching devices controlled by pulse width modulation. Although the drive disclosed in the '064 application provides a cost-effective solution for applications requiring limited regeneration capability, any use of line reactors therewith to reduce any distortions caused by the active front end unnecessary adds to the size and cost of the system.

U.S. patent application Ser. No. 11/540,232 (the '232 application) discloses a method for smoothing input current to a power delivery system having regeneration capability, and utilization of the method eliminates the need for the use of line reactors at the inputs of the regenerative power cells. When the method is being utilized, the power delivery system may be considered to be operating in a six step mode.

FIG. 1 illustrates various embodiments of a regenerative four quadrant power cell that may be utilized with the method described in the '232 application. The front end of the regenerative power cell includes six insulated gate bipolar transistors ($Q_{ap}$, $Q_{bp}$, $Q_{cp}$, $Q_{an}$, $Q_{bn}$ and $Q_{cn}$) and six diodes. When the drive is motoring and power is flowing from cell input to cell output, the free-wheeling diodes of the front end are conducting current. When the drive is regenerating and the power is flowing from cell output to cell input, the insulated gate bipolar transistors are conducting current. When the front end of the regenerative power cell is switching in the six step mode, cell input reactors are not needed due to the nature of the method. When the front end insulated gate bipolar transistors are switching in the six step mode, they are turning on or off the way diodes naturally do in a three phase diode rectifier of a non-regenerative cell.

FIG. 2 illustrates various embodiments of a switching sequence for the front end of the regenerative power cell of FIG. 1. As shown in FIG. 2, in every ⅙ fundamental cycle (60 degrees), a pair of insulate gate bipolar transistors, one from the upper bridge and the other from the lower bridge, are turned on, which results in the highest line-to-line voltage being applied to the DC bus. Therefore, a fundamental cycle (360 degrees) can be regarded as being divided into 6 windows, with each window being 60 degrees and having a different pair of insulated gate bipolar transistors turned on.

In the six step mode, the DC bus voltage of the power cell is not controlled. Therefore, if the line impedance is high and the drive is regenerating heavily (the output torque is high), at near rated speed where the primary regeneration current is the highest, the drive input voltage may increase to a point where one or more of the power cells trips on a DC bus over voltage fault.

SUMMARY

In one general respect, this application discloses a system for limiting input voltage to a power delivery system having regeneration capability. According to various embodiments, the system includes a regulator having a multiple input variables and at least one output variable; and an accumulator in communication with the regulator wherein the accumulator presets the output of the regulator to facilitate an output as well as accumulates error values related to the multiple input variables and facilitates a change by the regulator to the at least one output variable based upon the accumulated values.

In another general respect, this application discloses a method for limiting input voltage to a power delivery system having regeneration capability. According to various embodiments, the method includes determining a drive input power value, determining an Arms value, determining a maximum power value based on the Arms value, determining an error value based on the maximum power value and the drive input power value, and limiting a torque reference value based on the error value.

Aspects of the invention may be implemented by a computing device and/or a computer program stored on a computer-readable medium. The computer-readable medium may comprise a disk, a device, and/or a propagated signal.

DESCRIPTION OF DRAWINGS

Various embodiments of the invention are described herein by way of example in conjunction with the following figures.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
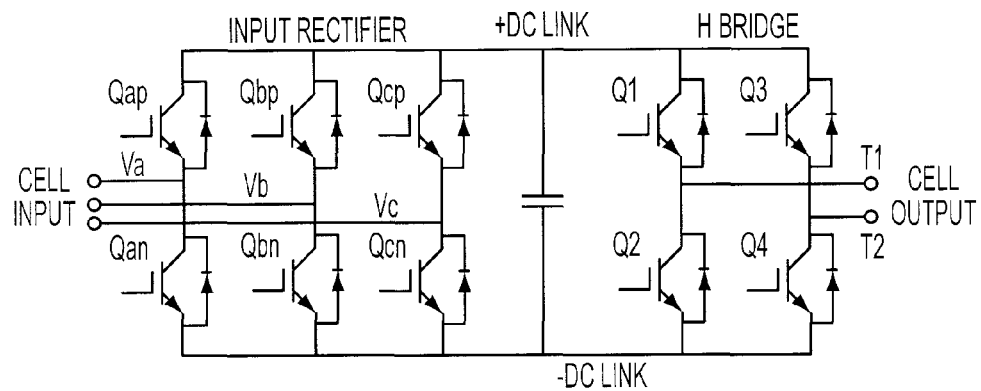
FIG. 1 illustrates various embodiments of a regenerative four quadrant power cell.
Figure 2:
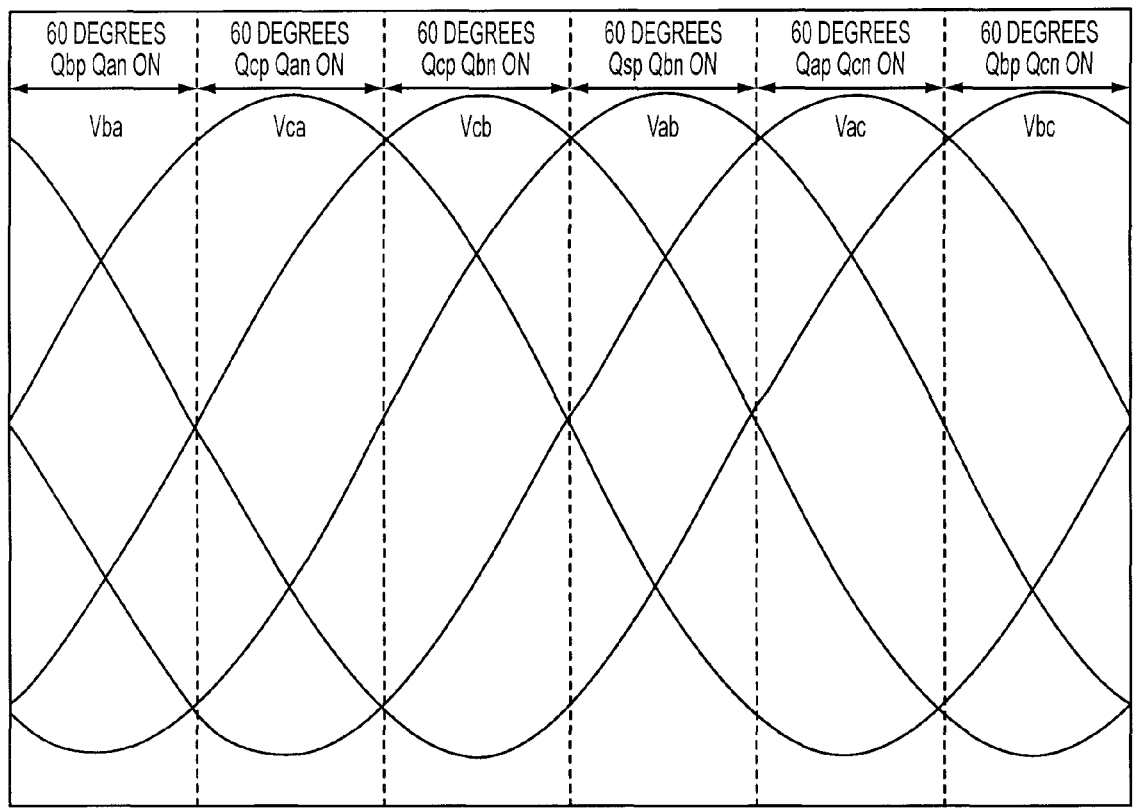
FIG. 2 illustrates various embodiments of a switching sequence for a front end of the regenerative power cell of FIG. 1.
Figure 3:
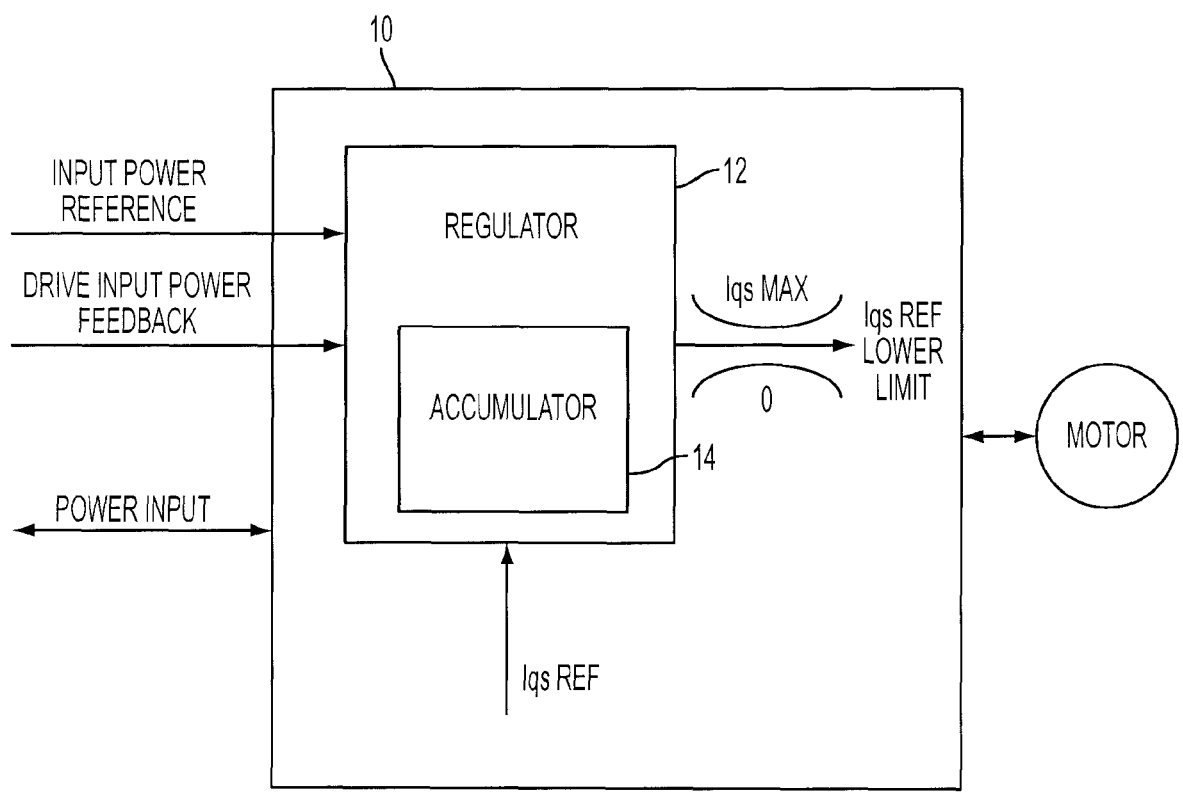
FIG. 3 illustrates various embodiments of a system for limiting input voltage to a power delivery system having regeneration capability.

FIG. 3 illustrates various embodiments of a system 10 for limiting input voltage to a power delivery system having regeneration capability. According to various embodiments, the system 10 may comprise a portion of a power supply. For example, the system 10 may comprise a portion of an AC motor drive. For reasons of clarity, the system 10 will be described with reference to a three-phase drive, and the input and output to the drive are shown in a single line format.

The system 10 includes a regulator 12 and according to various embodiments, regulator 12 includes an integrated accumulator 14. The regulator 12 and the accumulator 14 may be implemented in any suitable manner (e.g., hardware, software, firmware, or combinations thereof). It should also be noted that the accumulator is shown as an integral part of the regulator as an example only. The regulator and accumulator may be implemented as two separate components.

As shown in FIG. 3, the regulator 12 receives drive input power feedback, an input power reference, and a scaled torque command (e.g., Iqs Ref). The drive input power feedback may be obtained in any suitable manner. For example, according to various embodiments, the drive input power feedback may be obtained from the three input power lines by voltage attenuators and current transformers. The input power reference may be a calculated value based on the drive input voltage. The scaled torque command may be received, for example, from a speed regulator of the drive.

According to various embodiments, each of the inputs to regulator 12 is passed to accumulator 14. Accumulator 14 processes the inputs, and accumulates errors detected in the input signals. The error may indicate a fluctuation in the input power reference or the input power feedback. The accumulator sums the error, and this error is used as a factor to determine what value the regulator 12 outputs as a torque command. The addition of the accumulator results in a regulator configured to limit the torque reference which controls the amount of torque to and from the motor connected to the drive. The limiting of the torque reference by regulator 12 effects regenerative power flowing back through the drive, which in turn affects the input voltage to the drive due to impedance at the input lines to the drive. The operation of regulator 12 and accumulator 14 is further explained in the following discussion of FIG. 4.

Figure 4:
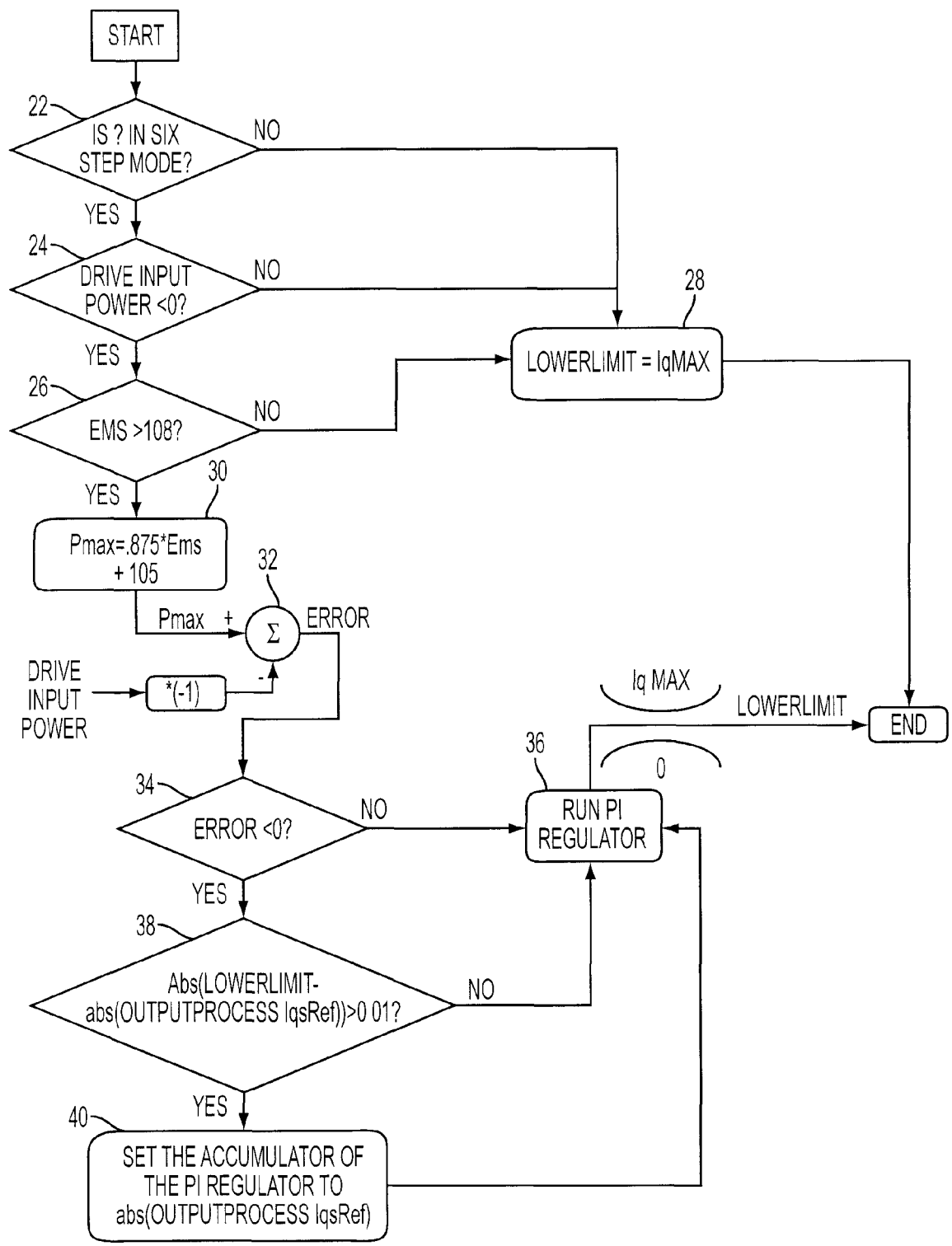
FIG. 4 illustrates various embodiments of a method for limiting input voltage to a power delivery system having regeneration capability.

FIG. 4 illustrates various embodiments of a method 20 for limiting input voltage to a power delivery system having regeneration capability. The method 20 may be utilized to limit the rise in drive input voltage produced by regenerative current in order to prevent a DC bus over voltage fault until the drive output torque is reduced to a point which will not result in an over voltage. Once this point is reached, the torque limitation caused by the operation of the method 20 is defeated and full braking torque is available. The system 10 may be utilized to implement the method 20. According to various embodiments, in order to speed up the response of the regulator 12, a presetting scheme may be utilized. When the conditions for implementation of the method 20 are present, but the output of the regulator 12 is not in control of the drive output torque reference, the accumulator 14 may be preset to the drive output torque reference at that moment in time.

As shown in FIG. 4, at the start of the process at block 22, it is determined whether or not the drive is operating in the six step mode. If the drive is operating in the six step mode, the process advances to block 24, where it is determined whether or not the drive input power is less than zero. If the drive input is less than zero, the process advances to block 26, where it is determined whether the Erms, or input voltage, is greater than a predetermined value. Although the predetermined value is shown in block 26 as 1.08, it is understood that the predetermined value may be a value other than 1.08. If any of the determinations made at blocks 22-26 are not in the affirmative, the process advances to block 28, where a lower limit of the torque current is set to IqMax.

If it is determined at block 26 that the Erms is greater than the predetermined value, the process advances from block 26 to block 30, where a maximum power value is determined. The maximum power value is based on the Erms. Although the maximum power value is shown in block 30 as being based on the equation [−8.75*Erms+10.5], it will be appreciated the maximum power value can be based on other equations related to Erms.

From block 30, the process advances to block 32, where the maximum power value is summed with a value based on the drive input power to generate an error value. Although the value based on the drive input power is shown as being a value equal to the drive input power multiplied by negative one, it will be appreciated that other drive input power values may be utilized.

From block 32, the process advances to block 34, where it is determined whether or not the error value is less than zero. If the error value is not less than zero, the process advances from block 34 to block 36, where the regulator 12 operates to set a lower limit for the torque current. However, if it is determined at block 34 that the error value is less than zero, the process advances from block 34 to block 38, where it is determined whether or not a difference between absolute values of a lower limit and a torque current reference is greater than a predetermined value. Although the predetermined value is shown in block 38 as 0.01, it will be appreciated that other predetermined values may be utilized.

If it is determined at block 38 that the difference is not greater than the predetermined value, the process advances from block 38 to block 36, where the regulator 12 operates as described hereinabove. However, if it is determined at block 38 that the difference is greater than the predetermined value, the process advances from block 38 to block 40, where the accumulator 14 is set to the absolute value of the torque current reference. By setting the accumulator to the absolute value of the torque current reference, the accumulator 14 acts to facilitate a fast change in regulator 12, e.g., an immediate change in the torque reference. From block 40, the process advances to block 36, where the regulator 12 operates as described hereinabove.

It should be noted the process described above as illustrated by FIG. 4 may be performed by a processor with an associated memory. The variables (e.g., ERMS, Iqs ref) may be stored in memory, and processed accordingly by the processor to determine any appropriate changes in the torque reference. The processor may be configured to send this information directly to a drive controller as discussed above.

While several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A system for limiting input voltage to a power delivery system having regeneration capability, the system comprising:
    a regulator having a plurality of input variables and at least one output variable;
    an accumulator in communication with the regulator, the accumulator configured to output a preset output variable at the regulator to facilitate a faster output at the regulator at a specific moment in time, wherein the accumulator is further configured to accumulate values related to the plurality of input variables and facilitates a change by the regulator to the at least one output variable based upon the accumulated value; and
    a drive controller in communication with the regulator, the drive controller receiving the output variable from the regulator and performing a specific function in response to the output variable.

2. The system of claim 1, wherein said accumulator further accumulates error values associated with the plurality of input variables.

3. The system of claim 2, wherein said error values indicate the current performance of said power delivery system.

4. The system of claim 1, wherein said plurality of input values comprises at least one of an input power reference, a drive input power feedback, and a torque current reference.

5. The system of claim 1, wherein said output value comprises an output torque reference.

6. The system of claim 5, wherein said output torque reference is used to control a motor.

7. The system of claim 1, wherein said accumulator is integral with said regulator.

8. A method for limiting input voltage to a power delivery system having regeneration capability, the method comprising:
    determining a drive input power value;
    determining an Erms value, wherein the Erms value is based upon an input voltage;
    at a regulator, determining a maximum power value based on the Erms value;
    outputting a preset drive output torque reference from an accumulator to facilitate an output variable from the regulator at a specific moment in time;
    determining an error value based on the maximum power value and the drive input power value at the accumulator and passing the error value to the regulator;
    processing the error value at the regulator and limiting the torque reference value based on the error value; and
    processing said output torque reference at a drive controller and performing a specific function in response to the output variable.

9. The method of claim 8, wherein further comprising summing said error value at an accumulator over a period of time.

10. The method of claim 9, wherein said limiting the torque reference value is based upon said summed error value.

11. The method of claim 8, further comprising determining a maximum and minimum level for said torque reference value.

12. The method of claim 11, further comprising comparing said error value against a predetermined error value, and limiting the torque reference value based upon a result of the comparison.

13. A system for limiting input voltage to a power delivery system having regeneration capability, the system comprising:
    a regulator having a plurality of input variables mid at least one output variable, wherein the regulator determines a maximum power value based on the plurality of input values;
    an accumulator in communication with the regulator, the accumulator configured to output a preset output variable at the regulator to facilitate a faster output at the regulator at a specific moment in time, wherein the accumulator is further configured to accumulate values related to the plurality of input variables and facilitates a change by the regulator to the at least one output variable based upon the accumulated value; and
    a drive controller in communication with the regulator, the drive controller receiving the output variable from the regulator and performing a specific function in response to the output variable.

14. The system of claim 13, wherein the plurality of input values comprises at least one of an input power reference, a drive input power feedback, and a torque current reference.

15. The system of claim 13, wherein said output value comprises an output torque reference.

16. The system of claim 15, wherein said output torque reference is used to control a motor.

17. The system of claim 13, wherein said accumulator is integral with said regulator.

* * * * *